Patented May 24, 1949

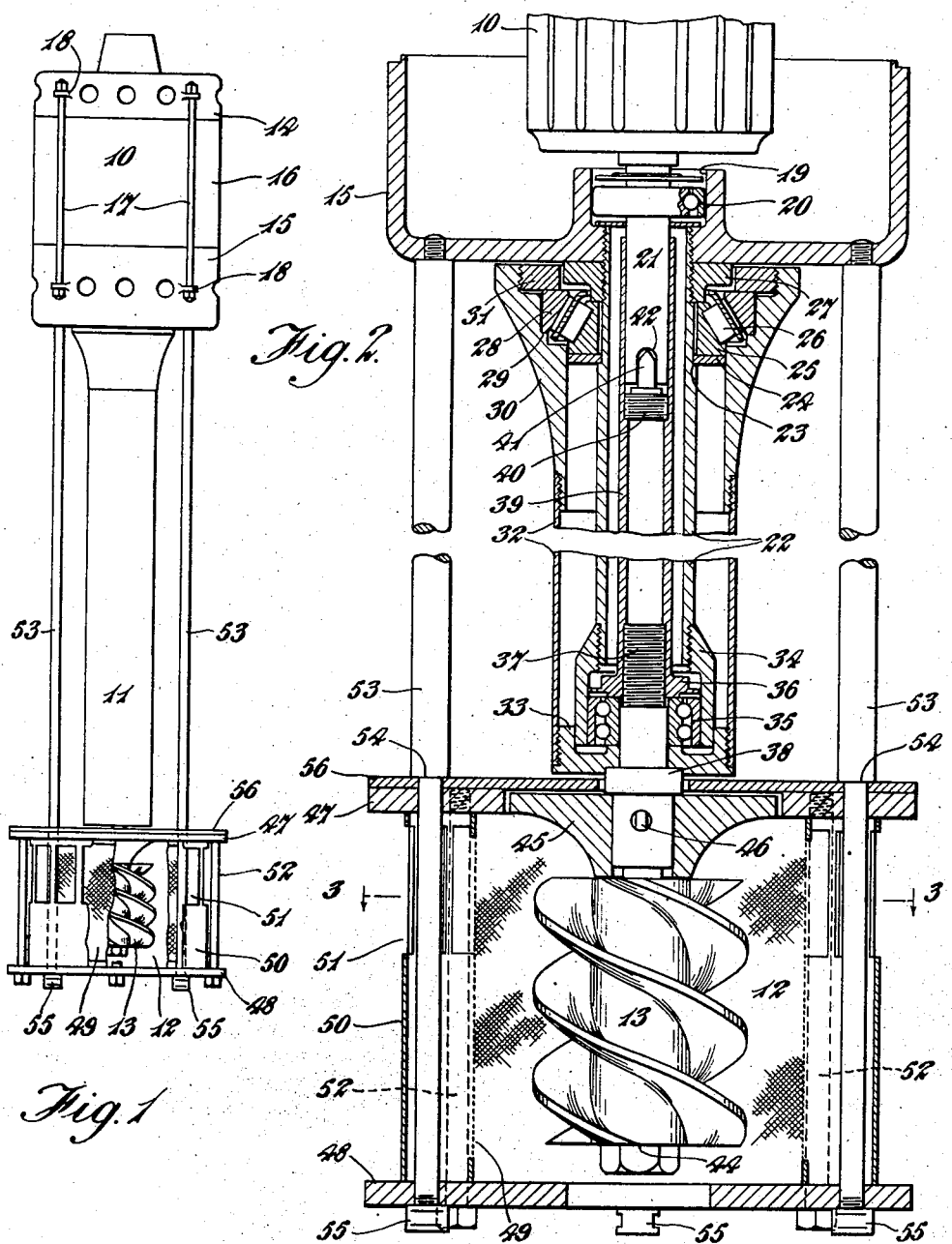

2,471,015

UNITED STATES PATENT OFFICE 2,471,015

ENCLOSED SHAFT DRIVE

Jack Watten, London, England

Original application July 21, 1947, Serial No. 762,225. Divided and this application March 29, 1948, Serial No. 17,690. In Great Britain September 11, 1946

3 Claims. (Cl. 308—227)

This invention relates to an enclosed shaft drive more particularly for mixing and emulsifying apparatus comprising an impeller driven by an electric motor, this application being divided out of my application No. 762,225, dated July 21, 1947.

The main object of the present invention is to provide improved drive transmitting means for a mixing or emulsifying apparatus, which fully protects the moving parts, and relieves the bearings of the driving motor of all end loads.

Another object of the invention is to provide a drive transmitting means for an impeller or like element driven by an electric motor comprising a tube secured to the motor casing, a drive shaft proper mounted in bearings at the end of the tube remote from the motor casing, and an outer sleeve mounted to revolve with the drive shaft and supported from the motor casing by a thrust bearing so as to relieve the drive shaft proper of all end loads.

In the drawing—

Figure 1 is an elevation of a mixing and emulsifying apparatus having a drive transmitting means according to the invention; and Figure 2 is a sectional elevation of the apparatus shown in Figure 1, the upper part of the motor being omitted.

Referring to the drawings, the apparatus comprises an electric motor generally indicated at 10, a drive assembly 11, and an emulsifying chamber 12, the impeller 13 being located in the emulsifying chamber 12, and driven by shaft means extending through the drive assembly 11. The electric motor 10 is enclosed in a ventilated housing comprising top and bottom plates 14 and 15 and a centre section 16 clamped between the end plates by bolts 17 engaging lugs 18 on the said plates. The bottom plate 15 is formed with an internal recess 19 to receive a ball bearing 20 in which is located the driving shaft 21 of the motor, and a tube 22 is screwed into a threaded hole in the said plate co-axial with the recess 19, so that the shaft 21 extends into the tube 22. The tube is shouldered externally at 23 to locate a washer 24 upon which rests the inner race 25 of a roller thrust bearing 26, the race 25 being retained in position by a nut 27 which in turn bears against the under face of the plate 15. The outer race 28 of the bearing 26 is held against a shoulder 29 in a tubular member 30 by an externally screwed ring 31 screwing into said member. The tubular member 30 is thus supported from the plate 15 by the tube 22 and bearing 26. A sleeve 32 screwed to the lower end of the member 30 has screwed into its lower end an annular end closure 33. On the lower end of the tube 22 there is mounted a shell 34 in which is located the outer race of a double row ball bearing 35, the inner race of which is clamped between the upper side of the end closure 33 and a disc 36 screwed on to an impeller shaft 37, the shaft 37 having a flange 38 which engages the underside of the closure 33. A tubular shaft 39 screwed on to the impeller shaft 37 above the disc 36 extends upwardly through the tube 22, and at its upper end fits over the driving shaft 21, a plug 40 screwed into the tubular shaft 39 having a flat-sided projection 41 engaging a transverse groove 42 in the lower end of the driving shaft 21 to transmit the drive. The drive from the motor 10 to the impeller is thus enclosed in the member 30, sleeve 32 and end closure 33, which together form a casing rotating with the shaft, and the said casing, together with the impeller shaft 37 and tubular shaft 39 is supported entirely by the bearing 26 from the motor bottom plate 15, no end load being supported by the driving shaft 21.

The impeller 13, which is fully described in my co-pending application No. 762,225 forms no part of the present invention, and is not described in detail herein.

It will be apparent that the drive mechanism, including all bearings, is completely protected from the substances on which the apparatus is operating, and thus both corrosion of the said drive mechanism and bearings, and contamination of the substances by oil or other substances from the working parts is avoided. Moreover, the weight of the moving parts, and the thrust of the impeller, is taken wholly by the thrust bearing 26 and is not borne by the motor driving shaft.

What I claim is:

1. Drive transmitting means for a mixing or emulsifying apparatus having an impeller driven by an electric motor enclosed in a housing, comprising a tube rigidly secured to and extending downwardly from said housing, driving shaft means extending through said tube to the impeller and located by bearings at the lower end of said tube, a casing surrounding said tube, a thrust bearing at the top of said tube to support said casing, and means at the lower end of said casing for supporting the driving shaft means against axial movement, whereby end loads in said shaft are transmitted through said casing to the tube and motor housing.

2. Drive transmitting means for a mixing or emulsifying apparatus having an impeller driven by an electric motor enclosed in a housing, comprising a driving shaft extending downwardly from the motor housing, a bearing adjacent the lower end of said shaft, means supporting said bearing from the motor housing, a casing rotating with the driving shaft and enclosing said bearing and supporting means, and a thrust bearing between said casing and the motor housing to support said casing against downward movement.

3. Drive transmitting means for a mixing or emulsifying apparatus having an impeller driven by an electric motor enclosed in a housing, comprising a tube secured to an end plate forming part of said housing, a motor shaft journalled in said end plate and projecting into said tube, a casing surrounding said tube, a thrust bearing mounted externally on the upper end of said tube and supporting said casing, an impeller shaft carrying the impeller at its lower end and supported against axial movement by said casing, a journal bearing for said impeller shaft in the lower end of said tube, and a drive coupling between said drive shaft and said impeller shaft.

JACK WATTEN.

No references cited.